United States Patent
Tanji (10) Patent No.: US 7,880,914 B2
(45) Date of Patent: Feb. 1, 2011

(54) IMAGE PROCESSING APPARATUS AND METHOD OF CONTROLLING NETWORK ACCESS OF IMAGE PROCESSING APPARATUS

(75) Inventor: Masamichi Tanji, Kawasaki (JP)

(73) Assignee: Canon Kabushiki Kaisha (JP)

(*) Notice: Subject to any disclaimer, the term of this patent is extended or adjusted under 35 U.S.C. 154(b) by 1046 days.

(21) Appl. No.: 11/625,600

(22) Filed: Jan. 22, 2007

(65) Prior Publication Data

US 2007/0171468 A1    Jul. 26, 2007

(30) Foreign Application Priority Data

Jan. 25, 2006    (JP)    .............................. 2006-016898

(51) Int. Cl.
*G06F 3/12* (2006.01)

(52) U.S. Cl. ................ 358/1.15; 358/1.1; 358/1.13; 358/1.16; 715/700; 715/733; 715/764; 715/810

(58) Field of Classification Search ................ 358/1.1, 358/1.13, 1.15, 1.16; 715/700, 733–747, 715/764, 810

See application file for complete search history.

(56) References Cited

U.S. PATENT DOCUMENTS

| | | | | |
|---|---|---|---|---|
| 5,572,652 | A * | 11/1996 | Robusto et al. | 715/755 |
| 6,173,312 | B1 * | 1/2001 | Atarashi et al. | 709/203 |
| 6,301,612 | B1 * | 10/2001 | Selitrennikoff et al. | 709/220 |
| 6,532,491 | B1 * | 3/2003 | Lakis et al. | 709/223 |
| 6,671,801 | B1 * | 12/2003 | Prakash | 713/1 |
| 6,687,707 | B1 * | 2/2004 | Shorter | 1/1 |
| 6,832,321 | B1 * | 12/2004 | Barrett | 726/11 |
| 7,577,948 | B2 * | 8/2009 | Zomaya et al. | 717/168 |
| 2002/0054321 | A1 * | 5/2002 | Kikuchi | 358/1.15 |
| 2003/0048303 | A1 * | 3/2003 | Mesa et al. | 345/771 |
| 2003/0184580 | A1 * | 10/2003 | Kodosky et al. | 345/734 |
| 2003/0237018 | A1 * | 12/2003 | Baba | 714/4 |
| 2005/0111856 | A1 * | 5/2005 | Kawai | 399/8 |
| 2005/0223332 | A1 * | 10/2005 | Ito | 715/747 |
| 2006/0031768 | A1 * | 2/2006 | Shah et al. | 715/735 |
| 2006/0069807 | A1 * | 3/2006 | Tagawa | 709/245 |
| 2006/0080385 | A1 * | 4/2006 | Blandford et al. | 709/203 |
| 2006/0119890 | A1 * | 6/2006 | Nakajima | 358/1.15 |
| 2006/0129658 | A1 * | 6/2006 | Kawai | 709/220 |
| 2006/0129669 | A1 * | 6/2006 | Kojima | 709/223 |
| 2006/0232819 | A1 * | 10/2006 | Kasamatsu | 358/1.15 |
| 2008/0141170 | A1 * | 6/2008 | Kodosky et al. | 715/810 |

FOREIGN PATENT DOCUMENTS

| | | |
|---|---|---|
| JP | 2003-167823 A | 6/2003 |
| JP | 2003-345552 A | 12/2003 |
| JP | 2006-019797 A | 1/2006 |

* cited by examiner

*Primary Examiner*—King Y Poon
*Assistant Examiner*—Kenneth Kwan
(74) *Attorney, Agent, or Firm*—Rossi, Kimms & McDowell LLP

(57) ABSTRACT

An image processing method can include storing pieces of identification information of information processing apparatuses; instructing to change the identification information stored; displaying, when the instructing step gives the instruction to change the identification information, the pieces of identification information of the information processing apparatuses stored; and searching for information processing apparatuses on the network. The method can also include displaying pieces of identification information of the information processing apparatuses found; and changing identification information selected from the pieces of identification information displayed in the first displaying step into identification information selected from the pieces of identification information displayed in the second displaying step.

5 Claims, 10 Drawing Sheets

IMAGE PROCESSING APPARATUS AND METHOD OF CONTROLLING NETWORK ACCESS OF IMAGE PROCESSING APPARATUS

BACKGROUND OF THE INVENTION

1. Field of the Invention

The present invention relates to an image processing apparatus which is connected on a network and has printer and copy functions, and a control method thereof.

2. Description of the Related Art

In recent years, upon using a plurality of computers (information processing apparatuses) and image processing apparatuses, it is a common practice to connect these apparatuses via a local area network (LAN). PCs (personal computers, also called information processing apparatuses), image processing apparatuses such as a printer, scanner, facsimile, and the like, which are connected to a LAN, can communicate with each other via the network. In recent years, a multifunction peripheral, which integrates a plurality of functions such as a printer function, scanner function, facsimile function, and the like as a multifunctional system, is known. This multifunction peripheral normally has a function of connecting to a LAN.

These image processing apparatuses normally have a security setting function. (e.g., see patent reference 1 and the like). The security setting function is provided for various purposes such as assurance of security of transfer data, defense against attacks via the network, limitations on PCs that can use the image processing apparatuses, and the like.

The security setting often includes information about the network address (IP address) and physical address (MAC (Media Access Control) address) of each PC serving as a communication partner. An example of the security function includes a filter function which permits or inhibits a communication from (or to) a terminal at the designated IP address or MAC address. Also, another example of the security function includes IPsec which sets security to have one-to-one correspondence between the multifunction peripheral and PC. The filter function sets and saves the address information of a source or destination whose communication is to be permitted or inhibited as a communication permitted or inhibited address. The IPsec sets and saves the IP address or the like of a communication partner using the IPsec as a security setting. In addition to the security setting, network information of the PC is registered in an address book stored in each image processing apparatus, and is used upon data transmission. For example, the multifunction peripheral can transmit image data which is read by its own scanner to the PC on the network using SMB (Server Message Block). In this case, the SMB uses the IP address and host name of the PC as a destination. That is, as the identification of the PC registered in the address book, the IP address and host name are used.

[Patent reference 1] Japanese Patent Laid-Open No. 2003-345552

As for a given PC on the LAN, if that PC must be replaced due to a failure or the like, the PC before the replacement and that after the replacement may have different identification information contents such as IP addresses, MAC addresses, and the like used to identify the PCs. For this reason, when the identification of that PC is registered as the security setting, address book, or the like on the image processing apparatus side, these pieces of identification information need be updated according to the replacement of the PC. That is, the image processing apparatus must delete the registered contents associated with the old PC before the replacement, and must register identification information and the like of the new PC after the replacement. Since the administrator of the network or the user of the PC must manually input these settings, operations are troublesome and readily cause setting errors.

SUMMARY OF THE INVENTION

It is an object of the present invention to solve the aforementioned problems. That is, it is an object of the present invention to provide an image processing apparatus on a network, which can change registered contents using identification information of an information processing apparatus more easily, when the identification information of the information processing apparatus on the network is changed.

In order to achieve the above object, the present invention has the following arrangement. That is, an image processing apparatus connected to a network, comprising:

a storage unit adapted to store a plurality of pieces of identification information of a plurality of information processing apparatuses;

an instruction unit adapted to instruct to change the identification information stored in the storage unit;

a first display unit adapted to display, when the instruction unit gives the instruction to change the identification information, the plurality of pieces of identification information of the plurality of information processing apparatuses stored in the storage unit;

a search unit adapted to search for information processing apparatuses on the network;

a second display unit adapted to display a plurality of pieces of identification information of the information processing apparatuses found by the search unit; and a change unit adapted to change identification information selected from the plurality of pieces of identification information displayed by the first display unit into identification information selected from the plurality of pieces of identification information displayed by the second display unit.

Further features of the present invention will become apparent from the following description of exemplary embodiments with reference to the attached drawings.

DESCRIPTION OF THE EMBODIMENTS

First Embodiment

<Configuration of Network System>

Figure 1:
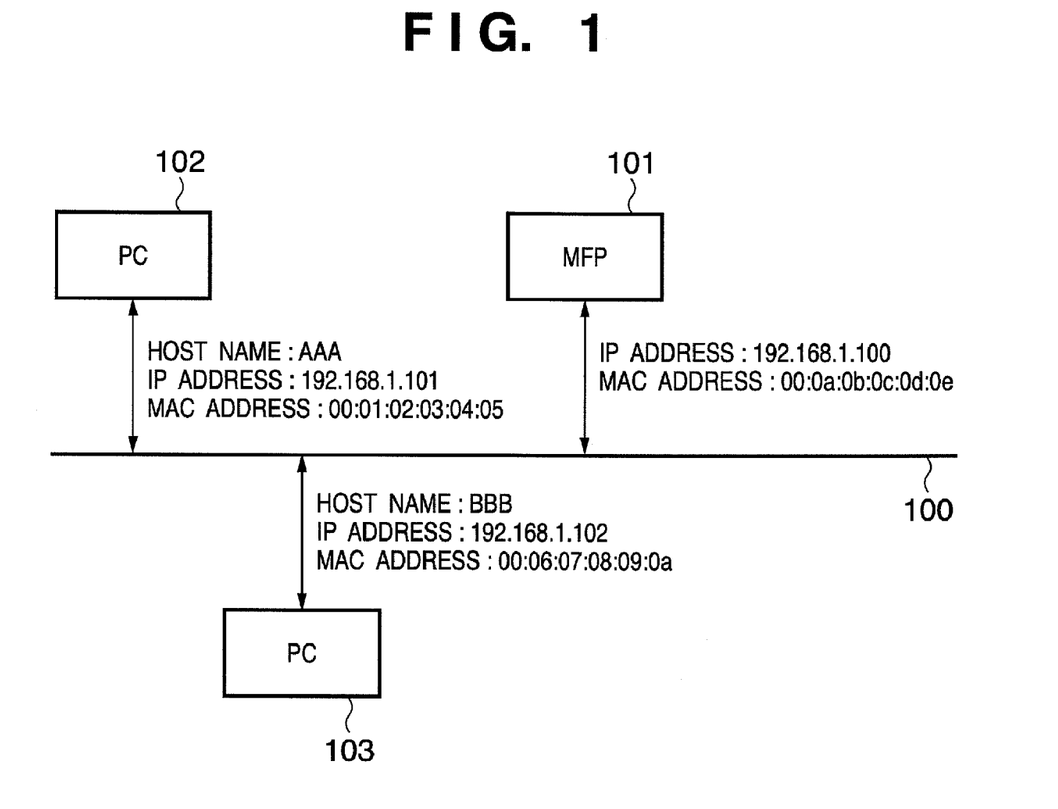
FIG. 1 is a diagram showing a configuration example of a network system according to one embodiment of the present invention.

FIG. 1 shows a configuration example of a network system to which one embodiment of the present invention is applied. As shown in FIG. 1, the network system has respective apparatuses such as a multifunction peripheral (MFP) 101 as an image processing apparatus and personal computers (PCs) 102 and 103 as information processing apparatuses. The MFP 101, PCs 102 and 103, and the like are connected via a local area network (LAN) 100 to be able to communicate with each other. In the network system shown in FIG. 1, assume that the respective apparatuses (MFP 101 and PCs 102 and 103) connected to the LAN 100 communicate with each other using the TCP/IP protocol, for the sake of simplicity. In the TCP/IP protocol, all terminals on the network are uniquely identified by network addresses (IP addresses) which are systematically assigned by the administrator of the network in correspondence with the network configuration. On the LAN, the respective terminals are uniquely identified by physical addresses assigned upon manufacture of terminals.

In this embodiment, as shown in FIG. 1, the MFP 101 is assigned an IP address "192.168.1.100" and MAC address "00:0a:0b:0c:0d:0e". The PC 102 is assigned an IP address "192.168.1.101" and MAC address "00:01:02:03:04:05". The PC 103 is assigned an IP address "192.168.1.102" and MAC address "00:06:07:08:09:0a". Furthermore, the PC 102 is set with a host name "AAA", and the PC 103 is set with a host name "BBB". The assigned addresses are saved in predetermined memory areas to be accessed by the TCP/IP protocol stack in the PCs and MFP. Also, in the PCs, the host names are saved in predetermined memory areas to be accessed by the TCP/IP protocol stack.

Furthermore, in this embodiment, the MFP 101 registers the host names of the PCs connected to the network in an address book saved in a hard disk or the like. Also, the IP addresses and MAC addresses are registered as the filter settings of the MFP 101, while the IPsec settings are made for the PCs 102 and 103.

Note that the network that connects the MFP 101, PCs 102 and 103, and the like is not limited to the LAN 100, and an arbitrary communication network can be applied. The present invention can be practiced by exchanging the MFP 101 by another image processing apparatus which holds an address book and security settings and is connected to the network. The PC will be exemplified as an information processing apparatus. However, the present invention can be practiced when image processing apparatuses such as an MFP, printer, scanner, and the like may be used as information processing apparatuses.

<Arrangement of MFP>

Figure 2:
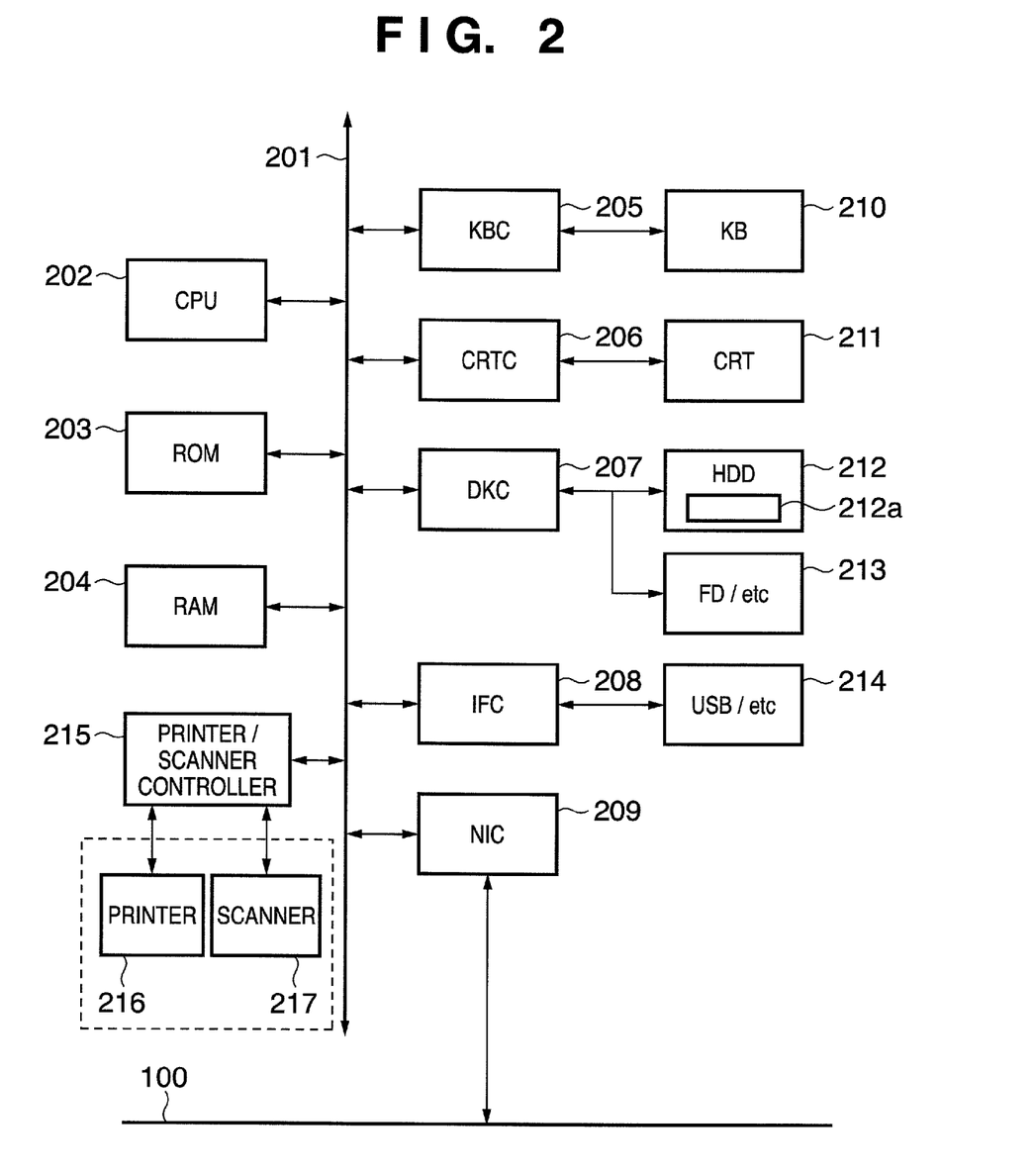
FIG. 2 is a schematic block diagram showing an internal arrangement example of an MFP shown in FIG. 1.

FIG. 2 is a schematic block diagram showing an internal arrangement example of the MFP 101 shown in FIG. 1. The MFP 101 has a CPU 202 which executes programs, a ROM 203 which comprises a nonvolatile memory that stores data and programs, and a RAM 204 which is used as a main memory and the like. The MFP 101 also has an input device controller (KBC) 205 for an input device (KB) 210, and a display device controller (CRTC) 206 for a display device (CRT) 211. Furthermore, the MFP 101 has a disk device controller (DKC) 207 for a hard disk drive (HDD) 212 and removable disk drive (FD/etc.) 213. The MFP 101 has an interface controller (IFC) 208 for a local interface (USB/etc.) 214 and a network device controller (NIC: network interface card) 209. A system bus 201 interconnects these building components to allow them to communicate with each other. The MFP 101 also has a print/scanner controller 215 which executes print processing and the like, a printer engine 216 which actually prints data, and a scanner 217 which scans an image. Moreover, the MFP 101 may comprise various functional blocks such as a facsimile unit and the like (although not shown). However, the effects obtained by this embodiment remain the same irrespective of the presence/absence of these devices.

The CPU 202 systematically controls the respective functional blocks connected to the system bus 201 by executing programs stored in the ROM 203 or HDD 212 or those supplied from the FD 213. That is, the CPU 202 reads out and executes processing programs used to attain desired operations from the ROM 203, HDD 212, or FD 213, thus implementing control to implement such operations. The overall MFP operates by collaboration of respective functions in response to instructions and the like from the CPU 202.

The ROM 203 stores instructions (programs) and the like to be read out by the CPU 202. Furthermore, the ROM 203 often stores font data and the like used in print processing. The RAM 204 serves as a main memory, work area, and the like of the CPU 202, and data stored in the RAM 204 may vanish upon turning off the power switch of the NFP. The RAM 204 may store programs. The KBC 205 processes input information from the input device (KB) 210 such as a keyboard, mouse, and the like. The CRTC 206 controls the display device (CRT) 211 such as a CRT display device, liquid crystal display device, or the like. The DKC 207 controls the fixed hard disk drive (HDD) 212 and the removable disk drive (FD/etc.) 213 such as a flexible disk or the like. The IFC 208 controls the local interface (USB/etc.) 214 such as USB, a serial port, and the like. The NIC 209 is connected to the LAN 100 in FIG. 1, and controls network communications.

The HDD 212 stores an address book 212a. The address book 212a stores host names. The user can set and maintain the address book 212a via a control panel of the MFP 101. Alternatively, if the user is an administrator having given authority, he or she can make such settings and maintenance from the PC via the network. For example, if the network comprises a DNS (domain name system) server, the IP address can be obtained from the host name. Therefore, the host name has the same meaning as the address. The address book 212a can be used as a destination of image data in, e.g., a push-scan operation. A hot folder used to store image data may be registered in the address book, or may be registered in a predetermined area in each PC. Of course, the purpose of the address book is not limited to the push-scan operation, and the address book can also be used as the source (PC) of pull-print data and destinations of various other general data.

<Operation Upon Terminal Replacement>

Figure 3:
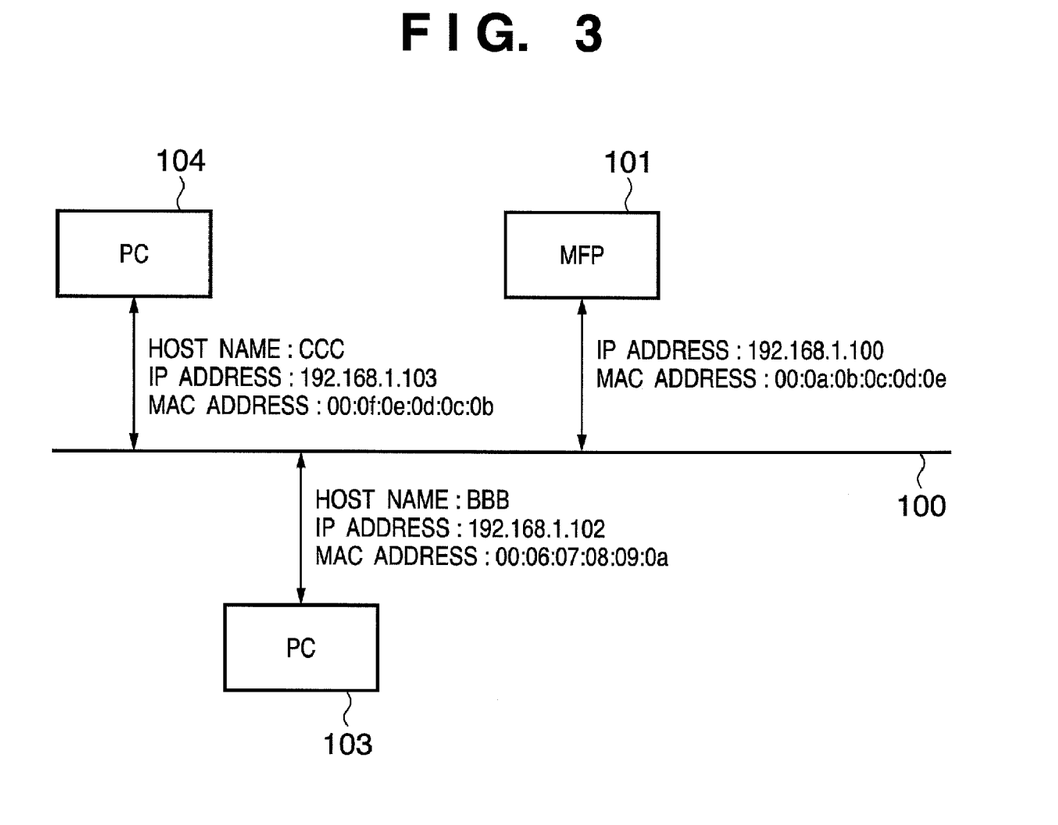
FIG. 3 is a diagram showing a configuration example after replacement of a PC has taken place in the network system according to the embodiment of the present invention.

Assume that a situation such as a failure or the like has occurred in the PC 102, and another PC replaces the PC 102 in the network system shown in FIG. 1. FIG. 3 shows a configuration example of the network system after replacement of the PC 102. FIG. 3 does not illustrate the PC 102 since it has already been removed from the LAN 100. Instead, FIG. 3 shows a PC 104 as the new PC after replacement. Note that the PC 104 has already undergone various settings such as installation of drivers, printer settings, and the like required to use the MFP 101 on the LAN 101. Also, the PC 104 is assigned an IP address "192.168.1.103", MAC address "00:0f:0e:0d:0c:0b", and host name "CCC".

Figure 4:
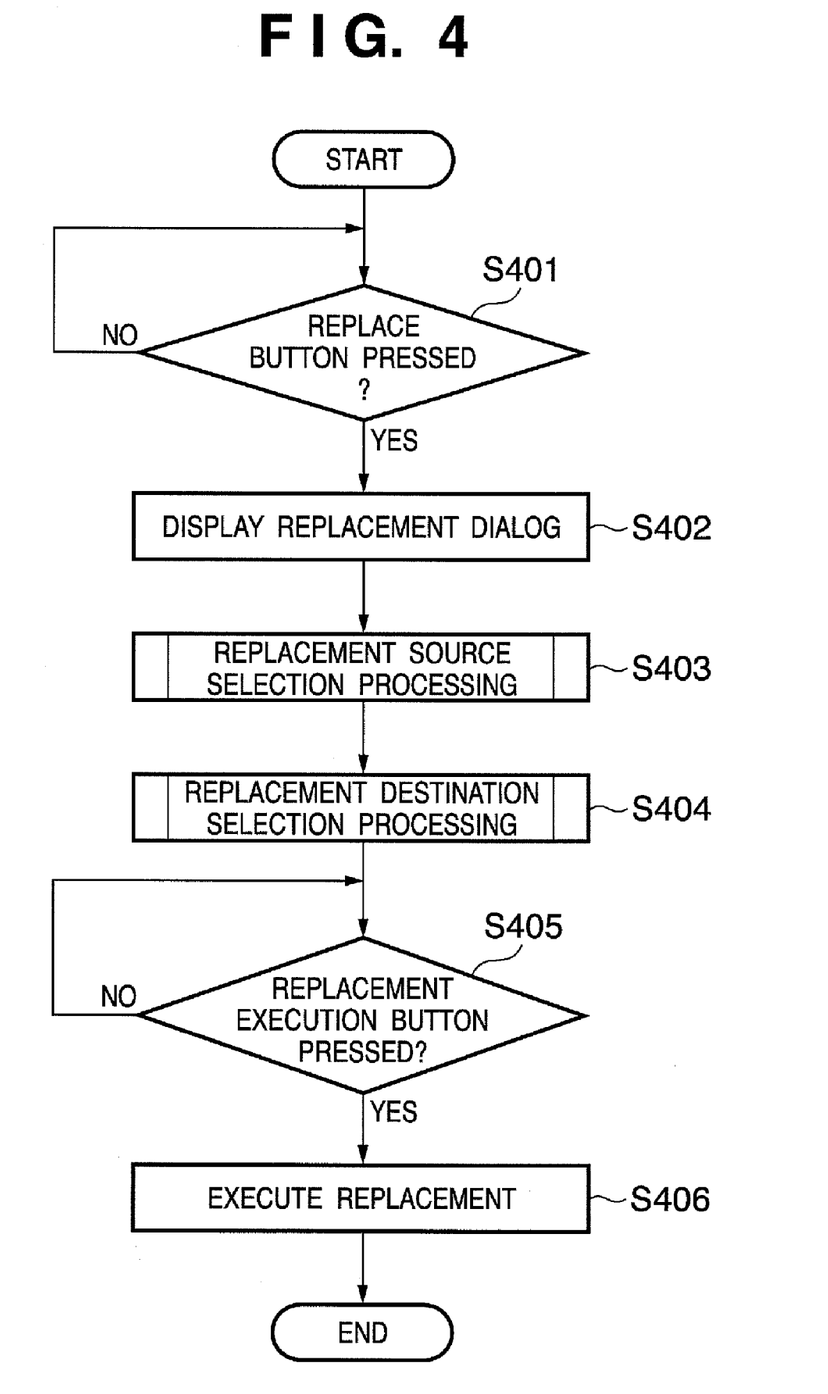
FIG. 4 is a flowchart showing the operation of the MFP in the embodiment.

FIG. 4 is a flowchart showing one embodiment of the operation of the MFP 101 in this embodiment. Note that steps S401 to S406 indicate respective processing steps, and describe the address book setting change processing in the MFP 101 after replacement from the PC 102 to the PC 104. The ROM 203 in the MFP 101 stores the control sequences corresponding to respective steps.

The MFP 101 waits for pressing of a replace button by the user such as the administrator of the network, a general user, or the like (step 401). The replace button may be prepared on an address book dialog (not shown) displayed on the display device 211 or the like, or may be arranged as a hardware button on the housing of the MFP 101.

If the user presses the replace button, the MFP 101 displays a replacement dialog on the display device 211 (step 402).

Figure 5:
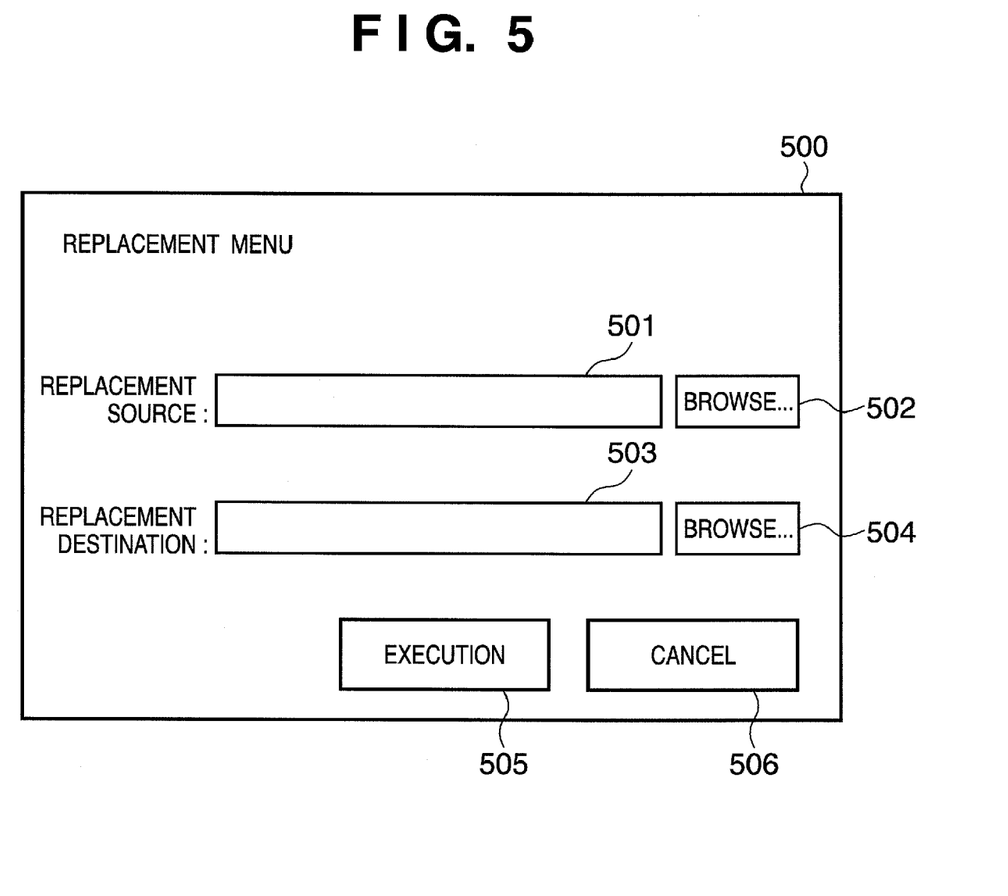
FIG. 5 shows an example of a replacement dialog displayed in the embodiment.

FIG. 5 shows one embodiment of the replacement dialog. A replacement dialog 500 includes an input field 501 used to set an apparatus as a replacement source, a browse button 502 used to browse the replacement source, an input field 503 used to set an apparatus as a replacement destination, a browse button 504 used to browse the replacement destination, an execution button 505 used to execute the replacement processing, and a cancel button 506 used to cancel the replacement processing and to leave the replacement dialog 500.

The MFP 101 displays the replacement dialog in step 402 and then executes replacement source selection processing (to be described later). If the user selects an apparatus as the replacement source in the replacement source selection processing, the MFP 101 saves identification information (replacement source identification information: the host name in this embodiment) of the selected replacement source apparatus in, e.g., a predetermined area of the RAM 204. Then, the MFP 101 displays the saved replacement source identification information in the input field 501 on the replacement dialog 500 (step 403). Note that the information indicating the selected apparatus may be either the same as or different from the identification information of the selected apparatus. For example, if the identification information includes address information, only the host name associated with the address information may be displayed in place of the address information. This is to display information that allows the user to easily associate with the apparatus. Note that the identification information in this embodiment is information used to identify the apparatus, and is, for example, network-related information (network information) such as the IP address, MAC address, host name, and the like.

Next, the MFP 101 executes replacement destination selection processing (to be described later). If the user selects an apparatus as the replacement destination in the replacement destination selection processing, the MFP 101 saves identification information of the selected replacement destination in, e.g., a predetermined area of the RAM 204. The MFP 101 then displays the replacement destination identification information in the input field 503 on the replacement dialog (step 404).

As a result, in steps 403 and 404 the replacement source apparatus and replacement destination apparatus are selected, and the MFP 101 saves their identification information and displays them on the replacement dialog 500.

After that, the MFP 101 waits for pressing of the execution button 505 by the administrator, user, or the like (step 405).

Upon pressing of the execution button 505, the MFP 101 searches registered identification information (the host names registered in the address book in this embodiment) for that which matches the selected replacement source identification information. The MFP 101 then changes the hit identification information with the selected replacement destination identification information (step 406). That is, the MFP 101 updates the replacement source identification information included in the address book by the replacement destination identification information. Of course, when the address book registers the network information such as the IP addresses, and the like in addition to or in place of the host names, the MFP 101 updates the network information. After the aforementioned processing, the MFP 101 ends these processing steps.

Figure 6:
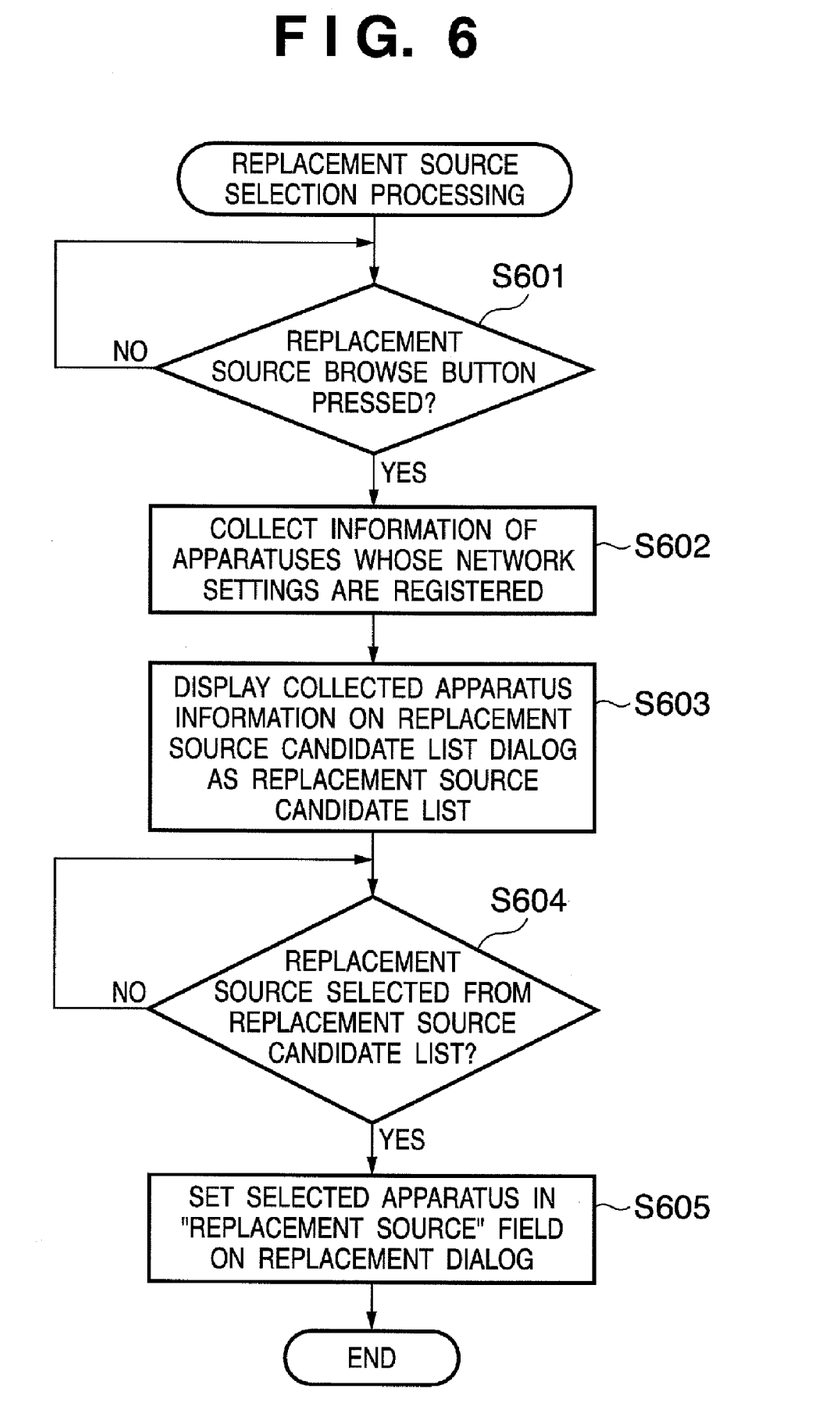
FIG. 6 is a flowchart showing replacement source selection processing of the MFP in the embodiment.

One embodiment of the replacement source selection processing to be executed by the MFP 101 in step 403 will be described in detail below using the flowchart shown in FIG. 6. In FIG. 6, S601 to S605 respectively indicate processing steps, and the ROM 203 in the MFP 101 stores the control sequences corresponding to the respective steps.

The MFP 101 waits for pressing of the replacement source browse button 502 by the administrator of the network, user, or the like on the replacement dialog 500 (step 601). Upon pressing the browse button 502, the MFP 101 searches the address book 212a to collect the already registered identification information such as the host names, IP addresses, and the like (step 602). For example, if the MFP 101 is an SNMP management station, it can register the address book in an MIB. In this case, in order to collect the identification information registered in the address book, the MFP 101 accesses the address book using, e.g., an MIB service.

Figure 7:
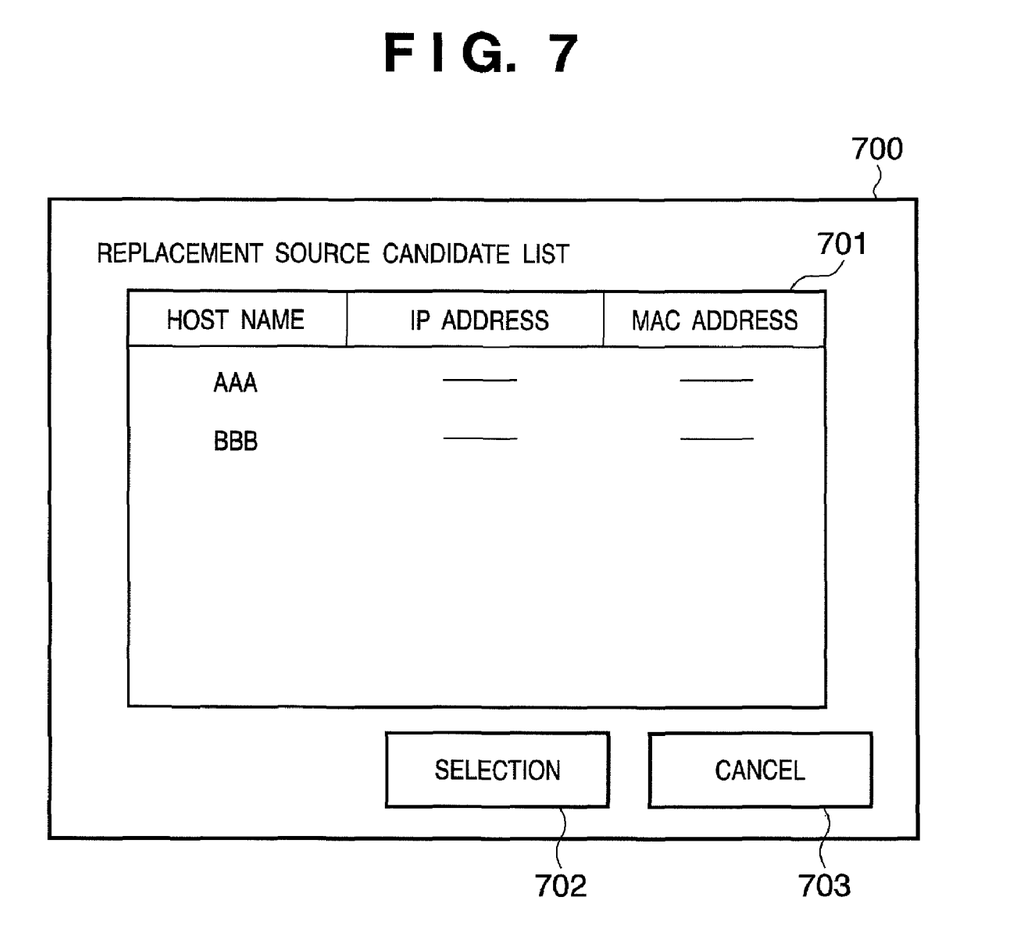
FIG. 7 shows an example of a replacement source selection dialog displayed in the embodiment.

The MFP 101 then displays the identification information collected in step 602 on a replacement source candidate dialog as a replacement source candidate list (step 603). FIG. 7 shows one embodiment of the replacement source candidate dialog. The display device 211 displays a replacement source candidate dialog 700. The replacement source candidate dialog 700 includes a replacement source candidate list 701 that displays the identification information collected in step 602, a selection button 702, and a cancel button 703. If the user selects one of some pieces of identification information shown in FIG. 7 and then presses the selection button 702, an apparatus to be actually replaced is selected from the replacement source candidate list 701. If the user presses the cancel button 703, the replacement source apparatus selection processing is canceled to quit the replacement source candidate dialog 700, thus returning to the replacement dialog 500.

In this embodiment, for example, assume that the host names of the PCs 102 and 103 are set in advance in the address book of the MFP 101. Therefore, in the processing in step 602, the MFP 101 collects the host names of the PCs 102 and 103 as replacement source candidates. For this reason, the replacement source candidate list 701 in FIG. 7 displays "AAA" as the host name of the PC 102 and "BBB" as that of the PC 103. Since the IP addresses and MAC addresses of the PCs 102 and 103 are not registered in the address book in this embodiment, an IP address field and MAC address field of the replacement source candidate list 701 do not display these values.

Next, the MFP 101 waits until the administrator of the network or the like selects an apparatus to be actually replaced from the replacement source candidate list 701 and presses the selection button 702 (step 604). This embodiment has assumed a situation in which the PC 102 is to be replaced. Therefore, in step 604 the administrator of the network or the user selects "AAA" as the host name of the PC 102 from the replacement source candidate list 701.

Upon pressing the selection button 702, the MFP 101 quits the replacement source candidate dialog 700 and returns to the replacement dialog 500. The MFP 101 then sets the host name of the apparatus selected in step 604 in the replacement source input field 501 on the replacement dialog 500 (step 605). That is, the MFP 101 saves the selected replacement source identification information, and displays it in the input field 501.

After the aforementioned processing, the MFP 101 ends these processing steps. One embodiment of the replacement source selection processing to be executed by the MFP 101 in step 403 has been described. Note that the user may directly input identification information in steps 403 and 404. In this case, the input identification information is used as the selected identification information. However, from the viewpoint of prevention of input errors, direct inputs may be inhibited, and the user may select identification information from an identification information candidate list prepared by the MFP 101.

Figure 8:
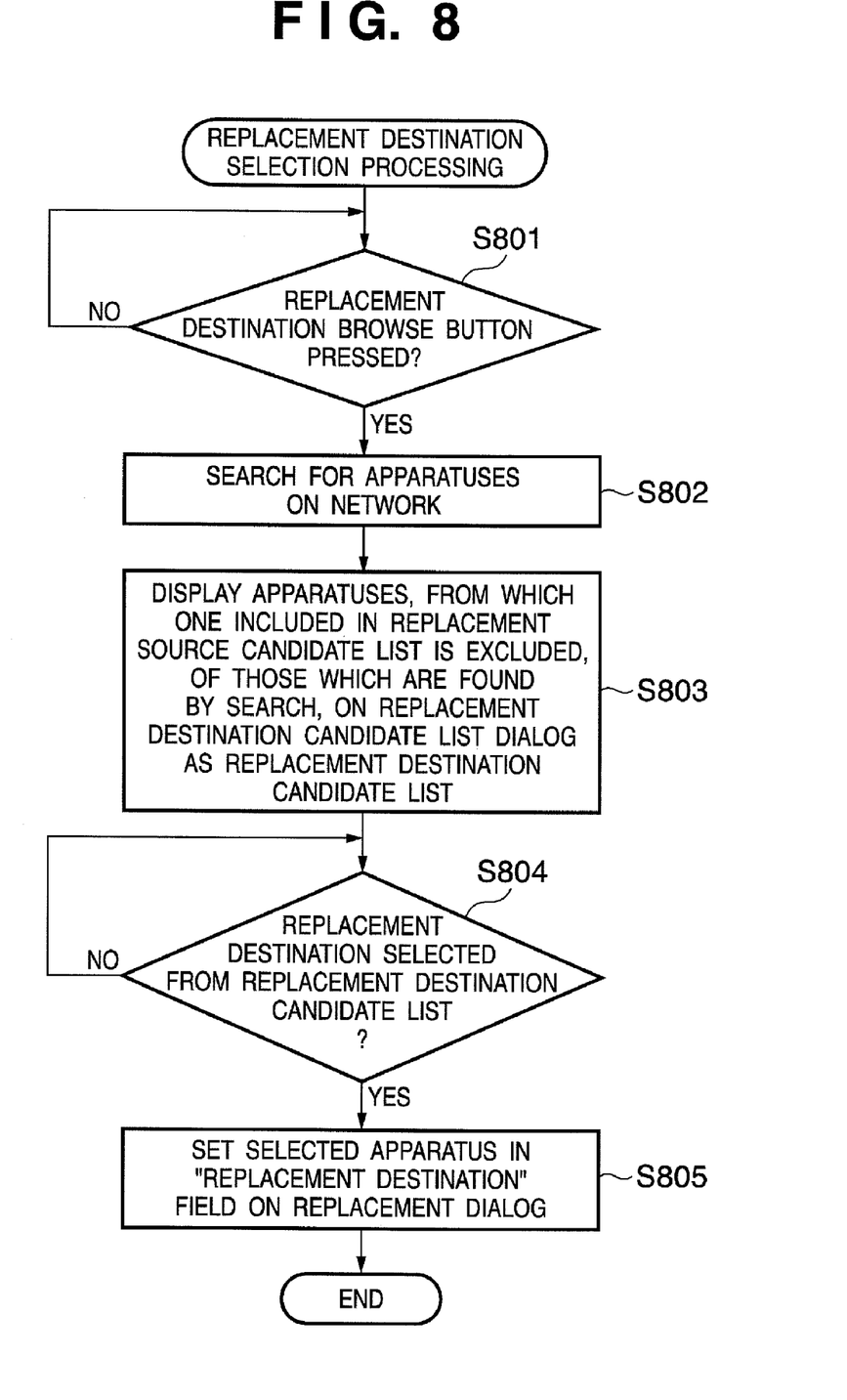
FIG. 8 is a flowchart showing replacement destination selection processing of the MFP in the embodiment.

One embodiment of the replacement destination selection processing to be executed by the MFP 101 in step 404 will be described in detail below using the flowchart shown in FIG. 8. In FIG. 8, S801 to S805 respectively indicate processing steps, and the ROM 203 in the MFP 101 stores the control sequences corresponding to the respective steps.

The MFP 101 waits for pressing of the replacement destination browse button 504 by the administrator of the network, user, or the like (step 801).

Upon pressing the browse button 504, the MFP 101 searches for the PCs on the LAN 100, and inquires each PC found as a result of search of the identification information such as the IP address, MAC address, and the like (step 802). As means for collecting the identification information, for example, the MIB service may be used. The MIB service searches for apparatuses connected to the network using a broadcasted SNMP message to acquire their IP addresses. Of course, if the identification information to be updated by the MFP 101 is only the IP address, since the required information can be obtained by the first search, the need for an inquiry of detailed information can be obviated.

The MFP 101 then checks if the identification information collected in step 802 includes an apparatus whose identification information such as the host name, IP address, MAC address, or the like matches that of the apparatus included in the replacement source candidate list 701 shown in FIG. 7. As a result of checking, if the apparatus that matches that included in the list is found, since that apparatus has already been registered in the MFP 101, the MFP 101 excludes the apparatus from replacement destination candidates. That is, the MFP 101 displays apparatuses, which correspond to the identification information collected in step 802 and are not included in the replacement source candidate list, as a replacement destination candidate list on a replacement destination candidate dialog (step 803).

Figure 9:
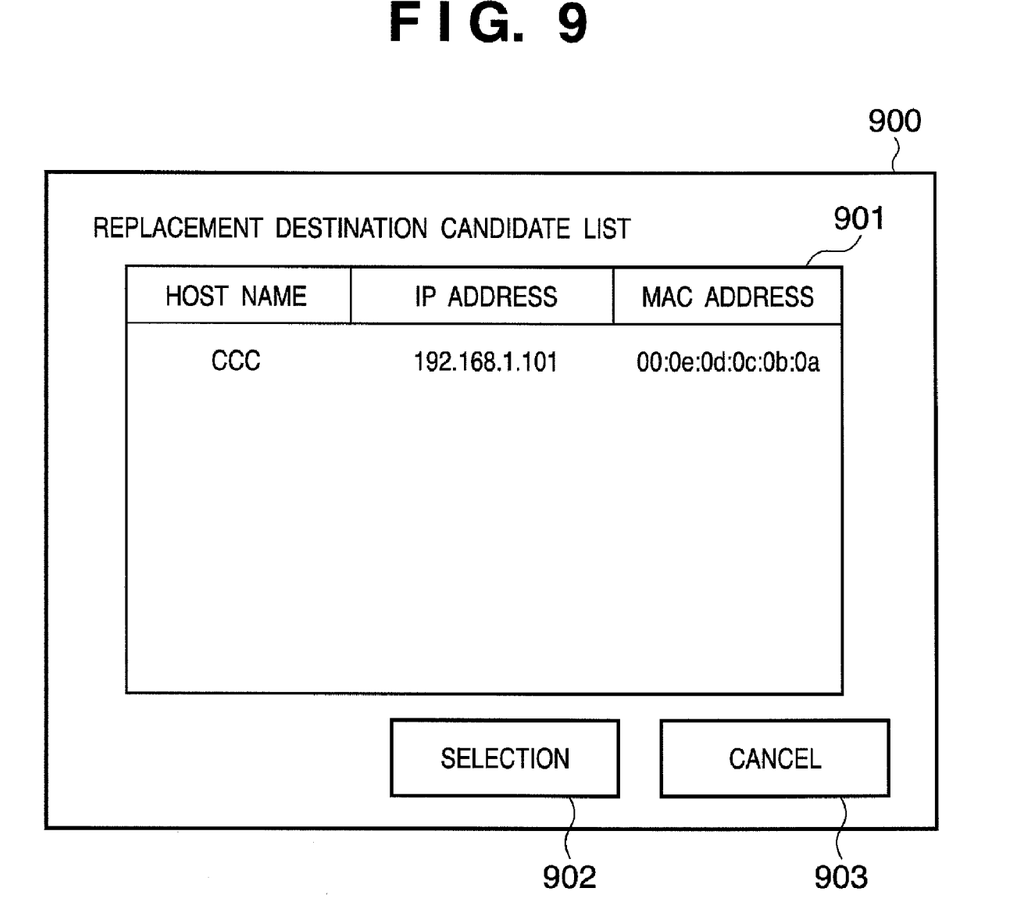
FIG. 9 shows an example of a replacement destination selection dialog displayed in the embodiment.

FIG. 9 shows one embodiment of the replacement destination candidate dialog. The display device 211 displays a replacement destination candidate dialog 900. The replacement destination candidate dialog 900 includes a replacement destination candidate list 901 which displays identification information such as the host name, IP address, MAC address, and the like for each apparatus as a replacement destination candidate, a selection button 902, and a cancel button 903. If the user selects identification information he or she wants to select, and presses the selection button 902, the apparatus that actually replaces the replacement source is selected from the replacement destination candidate list 901. If the user presses the cancel button 903, the replacement destination apparatus selection processing is canceled to quit the replacement destination candidate dialog 900, thus returning to the replacement dialog 500.

In this embodiment, two PCs, i.e., the PCs 103 and 104 exist on the LAN 100 in the network system after replacement shown in FIG. 3. For this reason, as a result of search on the LAN 100, these two PCs are found. However, the identification information acquired as a result of individual inquiries to the PCs 103 and 104 includes the host name "BBB" of the PC 103 included in the replacement source candidate list 701. Therefore, the MFP 101 determines that the PC 103 has already been registered in the address book, and excludes it from the replacement destination candidates. As a result, the replacement destination candidate list 901 displays the identification information (host name, IP address, and MAC address) of the PC 104.

Next, the MFP 101 waits until the administrator of the network or the like selects an apparatus that actually replaces the source from the replacement destination candidate list 901 and presses the selection button 902 (step 804). In this embodiment, only the PC 104 is listed up in the replacement destination candidate list 901. Since the PC 104 has actually replaced the PC 102, the administrator of the network or the user selects the PC 104 from the replacement destination candidate list 901.

Upon pressing the selection button 902, the MFP 101 quits the replacement destination candidate dialog 900 and returns to the replacement dialog 500. The MFP 101 then sets the host name of the apparatus (PC 104 in this embodiment) selected in step 804 in the replacement destination input field 503 on the replacement dialog 500 (step 805). That is, the MFP 101 saves the selected replacement destination identification information, and displays it in the input field 503.

After the aforementioned processing, the MFP 101 ends these processing steps. One embodiment of the replacement destination selection processing to be executed by the MFP 101 in step 404 has been described.

By executing the aforementioned steps, the apparatus information registered in the address book can be updated to the contents suited to the network system after replacement of the PC 102.

By excluding the identification of the apparatus included in the candidate list of the replacement source identification information from that of the replacement destination identification information, setting errors can be prevented.

Note that the above embodiment excludes the identification of the apparatus included in the candidate list of the replacement source identification information from that of the replacement destination identification information. However, the candidate list of the replacement destination identification information may also display the identification information of the apparatus included in the candidate list of the replacement source identification information. The user may select these pieces of identification information.

In the above embodiment, the change processing of the identification information registered in the MFP has been described under the assumption of replacement of the apparatuses. However, the present invention is not limited to replacement of the apparatuses but may be applied to a case wherein the IP address (or host name or the like) of the apparatus is simply changed as long as the identification information of the apparatus is to be changed. That is, the present invention can be applied to a case wherein the identification information registered is to be changed due to some reason in addition of replacement of the apparatuses.

The same applies to the following embodiments.

Second Embodiment

The first embodiment has explained the case wherein the address book of the MFP 101 registers the host names of the PCs 102 and 103. However, the address book may register identification information other than the host name in some cases. In this embodiment, for example, the address book of the MFP 101 registers the IP address "192.168.1.101" as identification information of the PC 102, and the host name "BBB" as that of the PC 103. This embodiment will explain a replacement source candidate dialog in such case. Note that this embodiment is substantially the same as that in the first embodiment, except that the address book registers information other than the host name.

Figure 10:
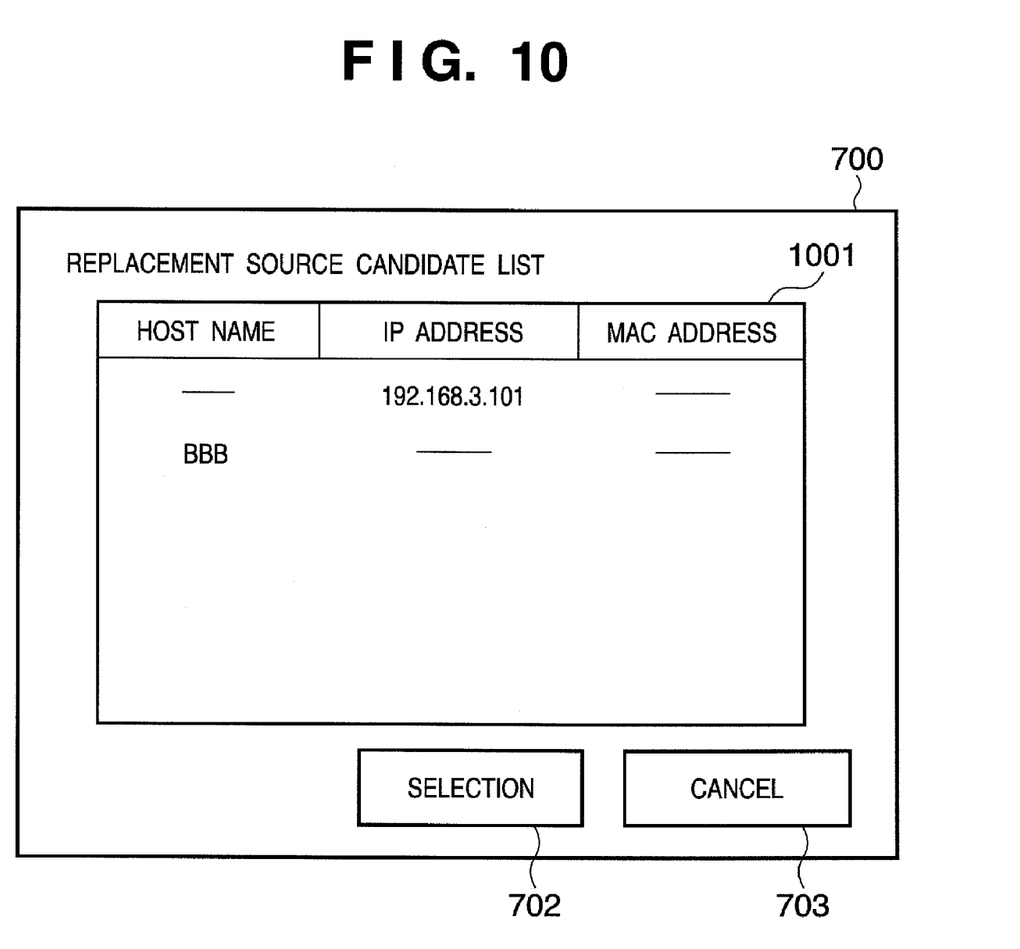
FIG. 10 shows an example of a replacement source selection dialog displayed in the second embodiment.

FIG. 10 shows one embodiment of the replacement source candidate dialog in this embodiment. FIG. 10 shows an example of the search result of the address book of the MFP 101 in the processing in step 602. The address book registers the IP address "192.168.1.101" as identification information of the PC 102, and the host name "BBB" as that of the PC 103. For this reason, a replacement source candidate list 1001 displays "192.168.1.101" as the IP address of the PC 102, and "BBB" as the host name of the PC 103. The replacement source candidate dialog 700, selection button 702, and cancel button 703 are the same as those in FIG. 7.

In step 406 in FIG. 4 as well, the selected replacement source identification information is updated by the selected replacement destination identification information.

Third Embodiment

The first and second embodiments have explained the update processing of the address book. The present invention can also be applied to various setting items in addition to the address book. For example, the present invention can be applied to a MAC filter, IP filter, IPsec, and the like, which use any of the host names, IP addresses, and MAC addresses. In this embodiment, the HDD 212 stores a MAC filter and IP filter. Respective filters register the address of a transmission-permitted destination terminal, that of a reception-permitted source terminal, that of a transmission-inhibited destination terminal, that of a reception-inhibited source terminal, and the like. The MAC filter registers the MAC addresses as the addresses of the terminals, and the IP filter registers the IP addresses.

In such a configuration, the MFP 101 reads identification information registered in the respective filters as candidates for replacement source identification information. The MFP 101 then displays the read identification information on the candidate list of the replacement source identification information. The MFP 101 rewrites the replacement source identification information selected from this candidate list by the address selected as the replacement destination identification information. Selection of the replacement destination identification information is as described in FIG. 8 of the first embodiment. Of course, the MAC filter is replaced by the MAC address, and the IP filter is replaced by the IP address. When each filter includes the host name, the replacement source identification information as the host name is rewritten by the replacement destination identification information.

In the MFP 101, the IP address of a communication partner using the IPsec is often registered in, e.g., the HDD 212. In this case, the MFP 101 displays the IP addresses of communication partners as the candidate list of the replacement source identification information. The MFP 101 rewrites the IP address as the replacement source identification information selected from the list by the replacement destination identification information. Selection of the replacement destination identification information is as described in FIG. 8 of the first embodiment. Note that whether or not to make an encrypted communication may differ depending on the settings of terminals. Hence, prior to rewriting the IP address of the communication partner, the MFP 101 may display a message that asks user's confirmation on the display unit. In such case, the MFP 101 rewrites the IP address only when the user inputs a message that permits to rewrite the IP address.

With the above sequence, the security settings of the filters and the like upon replacement of the apparatuses can be attained by a simple sequence. In addition, it is difficult for errors to occur.

Fourth Embodiment

The first embodiment uses the MIB service upon searching for the PCs on the LAN 100 in the processing in step 802. However, in this case, software required to implement an agent function in the SNMP protocol must be installed in advance on the PC side. For this reason, an ARP request to be broadcasted can be used as PC search means on the LAN 100. In this case, no measure such as pre-installation of software on the PC side is required.

Fifth Embodiment

The candidate list of the replacement source identification information to be displayed in step 603 in FIG. 6 of the first embodiment displays all pieces of apparatus information read out from the address book. By contrast, the MFP 101 may display only identification information of apparatuses which are registered in the address book but are not connected to the network as the candidate list of the replacement source identification information. To attain this, the MFP 101 executes step 802 in FIG. 8 prior to display of the candidate list of the replacement source identification information to search for apparatuses connected to the network, and acquires identification information. The MFP 101 displays identification information, which is included in the acquired identification information and is not included in the identification information read out from the address book as the candidate list of the replacement source identification information. In this way, a setting error, i.e., selection of the identification information of the connected device as the replacement source identification information, can be prevented.

Sixth Embodiment

The MFP 101 often stores a plurality of settings for the identification information of a given PC. For example, both the IP filter and IPsec may be set for the IP address "192.168.1.101" of the PC 102. If the IP address of the PC 102 is changed, the above embodiment changes both the settings of the IP filter and IPsec for the PC 102 to the changed IP address.

The sixth embodiment allows the user to select any of a plurality of setting contents, which are set using given identification information when the identification of an apparatus is changed by replacement or the like.

In this embodiment, if the user selects some replacement source from the replacement source candidate list in step 604 in FIG. 6, the MFP 101 displays a list of setting items in it in association with the identification information of that replacement source. The user selects a setting item, the identification information of which is to be changed from the list, selects the identification information as the replacement destination, and then inputs a change instruction.

In this way, even when the MFP stores a plurality of settings in association with identification information of a given apparatus, it can change only a setting of the user's choice to identification information after replacement. For example, when both the IP filter and IPsec are set for the IP address of the PC 102, the user can input an instruction to set only the IP filter but not to set the IPsec for the changed IP address. Also, when both the IP filter and MAC filter are set for a given apparatus, the user can input an instruction to set only the MAC filter but not to set the IP filter for the apparatus after replacement.

Other Embodiments

Note that the present invention can be applied to an apparatus comprising a single device or to a system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by a computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-16898 filed on Jan. 25, 2006 which is hereby incorporated by reference herein in its entirety.

What is claimed is:

1. An image processing apparatus connected to a network, comprising:
   a storage unit adapted to store a plurality of pieces of identification information of a plurality of information processing apparatuses;
   an instruction unit adapted to instruct to change the identification information stored in said storage unit;
   a first display unit adapted to display, when said instruction unit gives the instruction to change the identification information, the plurality of pieces of identification information of the plurality of information processing apparatuses stored in said storage unit;
   a search unit adapted to search for information processing apparatuses, other than said image processing apparatus, on the network;
   a second display unit adapted to display a plurality of pieces of identification information of the information processing apparatuses found by said search unit; and
   a change unit adapted to change identification information selected from the plurality of pieces of identification information displayed by said first display unit into identification information selected from the plurality of pieces of identification information displayed by said second display unit;
   wherein said storage unit stores settings associated with a plurality of types of setting items for one of the plurality of pieces of identification information, and said image processing apparatus further comprises a unit adapted to select, when said change unit changes the identification information selected from the plurality of pieces of identification information displayed by said first display unit, whether or not the selected identification information is changed for all the plurality of types of setting items for the selected identification information.

2. The apparatus according to claim 1, wherein said selection unit selects an item to be changed of the plurality of types of setting items for the identification information.

3. The apparatus according to claim 1, wherein one of the types of setting items is an IP filter setting, a MAC filter setting, an IPsec setting, or a setting registered in an address book.

4. An image processing method in an image processing apparatus connected to a network, comprising:
   a storage step of storing a plurality of pieces of identification information of a plurality of information processing apparatuses;

an instruction step of instructing to change the identification information stored in the storage step;

a first display step of displaying on a first display unit, when the instruction step instructs to change the identification information, the plurality of pieces of identification information of the plurality of information processing apparatuses stored in the storage step;

a search step of searching for information processing apparatuses, other than said image processing apparatus, on the network;

a second display step of displaying on a second display unit a plurality of pieces of identification information of the information processing apparatuses found in the search step; and a change step of changing identification information selected from the plurality of pieces of identification information displayed, on the first display unit, in the first display step into identification information selected from the plurality of pieces of identification information displayed, on the second display unit, in the second display step;

wherein said storage step stores settings associated with a plurality of types of setting items for one of the plurality of pieces of identification information, and said method further comprises a selecting step that selects, when said change step changes the identification information selected from the plurality of pieces of identification information displayed, on the first display unit, by said first display step, whether or not the selected identification information is changed for all the plurality of types of setting items for the selected identification information.

5. A non-transitory computer-readable storage medium including a program which, when executed by a computer connected to a network, causes the computer to execute an image processing method, said method comprising:

a storage step of storing a plurality of pieces of identification information of a plurality of information processing apparatuses;

an instruction step of instructing to change the identification information stored in the storage step;

a first display step of displaying on a first display unit, when the instruction step instructs to change the identification information, the plurality of pieces of identification information of the plurality of information processing apparatuses stored in the storage step;

a search step of searching for information processing apparatuses, other than said computer, on the network;

a second display step of displaying on a second display unit a plurality of pieces of identification information of the information processing apparatuses found in the search step; and a change step of changing identification information selected from the plurality of pieces of identification information displayed, on the first display unit, in the first display step into identification information selected from the plurality of pieces of identification information displayed, on the second display unit, in the second display step;

wherein said storage step stores settings associated with a plurality of types of setting items for one of the plurality of pieces of identification information, and said method further comprises a selecting step that selects, when said change step changes the identification information selected from the plurality of pieces of identification information displayed, on the first display unit, by said first display step, whether or not the selected identification information is changed for all the plurality of types of setting items for the selected identification information.

* * * * *